United States Patent
Patel et al.

(10) Patent No.: US 9,682,347 B2
(45) Date of Patent: Jun. 20, 2017

(54) POLYMER DISSOLUTION SYSTEM

(71) Applicant: Ecolab USA Inc., Naperville, IL (US)

(72) Inventors: Mayur Patel, Naperville, IL (US);
Jeffrey R. Cramm, Batavia, IL (US);
Stephen B. Smith, Naperville, IL (US)

(73) Assignee: ECOLAB USA INC., Naperville, IL (US)

( * ) Notice: Subject to any disclaimer, the term of this patent is extended or adjusted under 35 U.S.C. 154(b) by 460 days.

(21) Appl. No.: 14/197,924

(22) Filed: Mar. 5, 2014

(65) Prior Publication Data
US 2014/0319071 A1 Oct. 30, 2014

Related U.S. Application Data

(60) Provisional application No. 61/784,767, filed on Mar. 14, 2013.

(51) Int. Cl.
*B01D 21/01* (2006.01)
*C02F 1/52* (2006.01)
(Continued)

(52) U.S. Cl.
CPC ........ *B01F 1/0038* (2013.01); *B01D 29/0013* (2013.01); *B01D 29/0018* (2013.01);
(Continued)

(58) Field of Classification Search
None
See application file for complete search history.

(56) References Cited

U.S. PATENT DOCUMENTS 5,222,807 A * 6/1993 Gaddis ............. B01F 1/00
210/408
5,406,974 A * 4/1995 Griswold ............. B01D 35/157
137/454.6
(Continued)

FOREIGN PATENT DOCUMENTS

JP 2000037608 A 2/2000
JP 2007021357 A * 2/2007
(Continued)

OTHER PUBLICATIONS

Machine translation of Oshima, et al. JP # 2007021357A, pp. 1-5.*
International Search Report and Written Opinion dated Jul. 28, 2014 for PCT/US2014/020672.

*Primary Examiner* — Clare Perrin
(74) *Attorney, Agent, or Firm* — Eric D. Babych; Brinks Gilson & Lione

(57) ABSTRACT

The present invention is directed to a polymer dissolution system comprising a mix tank, a strainer, and a pump. The mix tank is configured to receive polymers, water, and an inlet stream, to form a polymer solution including swollen polymers, and to discharge the polymer solution. The strainer is configured to receive the polymer solution, and to withdraw at least a portion of the swollen polymers therethrough substantially without shear degradation, thereby forming a resultant solution, wherein the swollen polymers are dissolved at least in part. The pump is configured to receive the resultant solution, and to return the resultant solution to the inlet stream. In some embodiments, the strainer and the pump cooperate together to maintain a viscosity of the resultant solution substantially within a predetermined range.

11 Claims, 4 Drawing Sheets

(51) Int. Cl.
- *B01D 37/00* (2006.01)
- *B01D 35/02* (2006.01)
- *B01D 35/28* (2006.01)
- *B01F 3/12* (2006.01)
- *B01F 1/00* (2006.01)
- *B01D 29/00* (2006.01)
- *C02F 1/56* (2006.01)
- *B01F 5/10* (2006.01)
- *B01F 7/16* (2006.01)
- *B01D 12/00* (2006.01)
- *B03D 3/00* (2006.01)
- *C02F 1/00* (2006.01)
- *B01D 35/00* (2006.01)
- *E03B 5/00* (2006.01)
- *C02F 1/68* (2006.01)

(52) U.S. Cl.
CPC .......... *B01F 3/1221* (2013.01); *B01F 3/1271* (2013.01); *B01F 5/10* (2013.01); *B01F 7/16* (2013.01); *C02F 1/5227* (2013.01); *C02F 1/56* (2013.01); *B01D 35/02* (2013.01); *C02F 1/685* (2013.01); *C02F 1/686* (2013.01)

(56) References Cited

U.S. PATENT DOCUMENTS

| | | | |
|---|---|---|---|
| 5,407,975 A * | 4/1995 | Pardikes | B01F 1/00 523/322 |
| 5,718,822 A * | 2/1998 | Richter | B01D 35/02 200/83 A |
| 2004/0071572 A1* | 4/2004 | Greter | F04B 43/0054 417/413.1 |
| 2005/0126976 A1* | 6/2005 | Yoda | C02F 1/488 210/222 |
| 2008/0029458 A1* | 2/2008 | Fout | C02F 1/5227 210/702 |
| 2010/0032379 A1* | 2/2010 | Komido | C02F 11/14 210/702 |

FOREIGN PATENT DOCUMENTS

| | | |
|---|---|---|
| JP | 2011005419 A | 1/2011 |
| RU | 2260568 C1 | 9/2005 |
| RU | 2270809 C2 | 2/2006 |
| WO | WO 96/14923 | 5/1996 |

\* cited by examiner

POLYMER DISSOLUTION SYSTEM

CROSS-REFERENCE TO RELATED APPLICATIONS

This application claims the benefit of U.S. Provisional Application No. 61/784,767, filed Mar. 14, 2013, the entire contents of which are hereby incorporated by reference.

FIELD OF THE INVENTION

The present disclosure relates to the development and use of polymer dissolution systems and methods of dissolving polymers.

BACKGROUND OF THE INVENTION

Flocculant polymers can be dissolved in water to form an activated solution. The activated solution can be useful in a variety of systems, e.g., for treating wastewater. The starting material for the polymers, however, is typically cumbersome to handle. For example, it may be time-consuming to dissolve the starting material. Moreover, the starting material may be in a form of a wet gel including sticky or cohesive particles, which can be difficult to handle. Even if dissolved, the polymers are subject to undesirable shear or rupture degradation. Thus, there has developed a need for a polymer dissolution system that can rapidly and efficiently dissolve polymers in water, substantially without shear degradation.

SUMMARY OF THE INVENTION

The present disclosure is directed to a polymer dissolution system comprising a mix tank, a strainer, and a pump. The mix tank is configured to receive polymers, water, and an inlet stream, to form a polymer solution including swollen polymers, and to discharge the polymer solution. The strainer is configured to receive the polymer solution, and to withdraw at least a portion of the swollen polymers therethrough substantially without shear degradation, thereby forming a resultant solution, wherein the swollen polymers are dissolved at least in part. The pump is configured to receive the resultant solution, and to return the resultant solution to the inlet stream. In some embodiments, the strainer and the pump cooperate together to maintain a viscosity of the resultant solution substantially within a predetermined range.

The present disclosure is also directed to a strainer comprising a first conduit, a second conduit branching from the first conduit, and a screen in the second conduit. The screen includes openings dimensioned so as to allow high-molecular-weight polymers to pass through substantially without shear degradation.

The present disclosure is also directed to a method of dissolving high-molecular-weight polymers. The method comprises supplying high-molecular-weight polymers, water, and an inlet stream. A polymer solution including swollen polymers is formed. At least a portion of the swollen polymers is withdrawn through a strainer substantially without shear degradation, thereby forming a resultant solution. The resultant solution is returned to the inlet stream.

Other aspects of the invention will become apparent by consideration of the detailed description and accompanying drawings.

DETAILED DESCRIPTION

Described herein is a polymer dissolution system comprising a strainer in fluid communication with a mix tank and a pump. This system is advantageous in preparing a highly activated solution of water-soluble dry polymers for use as flocculants without shear degradation. The strainer comprises a first conduit, a second conduit branching from the first conduit, and a screen in the second conduit. The screen includes openings dimensioned so as to allow high-molecular-weight polymers to pass through substantially without shear degradation. The strainer is configured to receive a polymer solution, and to withdraw at least a portion of the polymers from the polymer solution, thereby forming a resultant solution. The resultant solution is returned to an inlet stream of the polymer dissolution system. The strainer and the pump cooperate together to maintain a viscosity of the resultant solution substantially within a predetermined range.

The polymer dissolution system enables the use of wet gels as flocculants or viscosifying agents. Wet gels are generally lower in cost compared to dry polymer powders, because dry polymer powders typically require additional equipments in production for drying, grinding, and sieving. However, wet gels can include sticky polymer particles, and therefore can be difficult to handle. The sticky polymer particles in the wet gels can measure up to about 10 mm in the longest dimension. Wet gels that include such particles can be slow to dissolve in water. In the polymer dissolution system, the polymer particles are uncoiled, unfolded, or expanded at least in part as they pass through the strainer. As such, the polymer dissolution enables a rapid and efficient dissolution of wet gels substantially without causing shear degradation.

1. DEFINITIONS

The terminology used herein is for the purpose of describing particular embodiments only and is not intended to be limiting. As used in the specification and the appended claims, the singular forms "a," "and" and "the" include plural references unless the context clearly dictates otherwise.

"Copolymer" as used herein may mean a polymer derived from two or more structural units or monomeric species, as opposed to a homopolymer, which is derived from only one structural unit or monomer.

For the recitation of numeric ranges herein, each intervening number therebetween with the same degree of precision is explicitly contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are explicitly contemplated.

2. POLYMER DISSOLUTION SYSTEM

Figure 1:
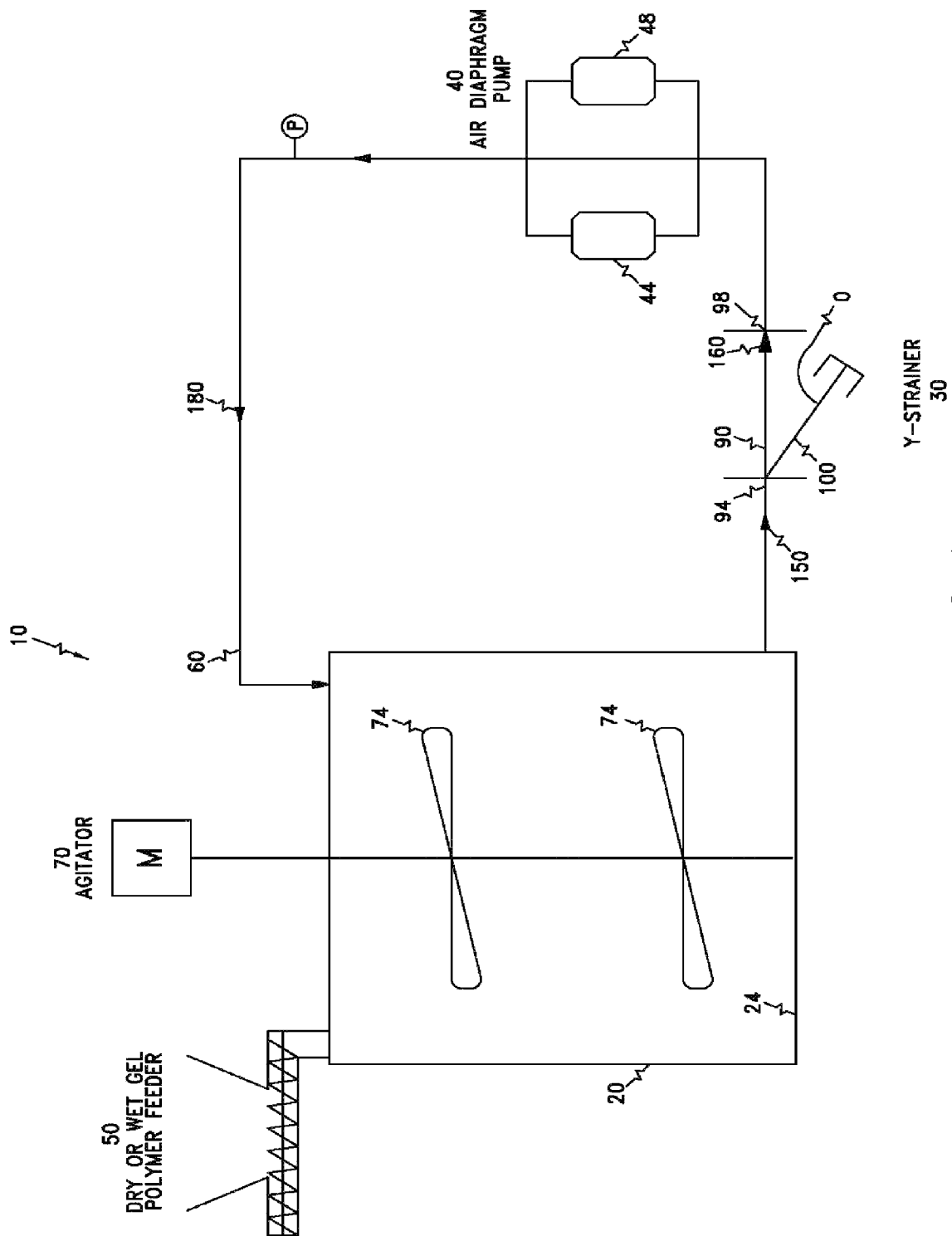
FIG. 1. Schematic illustration of a polymer dissolution system according to one embodiment of the invention, illustrating a strainer in fluid communication with a mix tank and a pump.

The present invention is directed to a polymer dissolution system that rapidly dissolves polymers to a fully activated solution while preventing shear degradation of these polymers. FIG. 1 illustrates a polymer dissolution system 10 comprising a mix tank or vessel 20, a strainer 30, and a pump 40. The mix tank 20 includes a cavity 24 and is configured to receive polymers and water therein. The polymers include at least one of a dry polymer powder (e.g., containing no more than 15% water) and a wet gel or hydrated solid gel (e.g., containing from about 15% to about 80% water). In some embodiments, the polymers are produced from water soluble monomers by free radical polymerization. The monomers can include, but are not limited to, acrylamide, acrylic acid (and salts of acrylic acid), sodium 2-acrylamid-2-methylpropane-1-sulfonate, and 2-(acryloyloxy)-N,N,N-trimethylethanaminium chloride to make anionic, cationic, and nonionic water soluble polymers. In other embodiments, the polymers may be produced in other manners from other materials.

The dry polymer powder is soluble in water. In some embodiments, a dry polymer powder particle may measure no more than about 2.0 mm, no more than about 1.9 mm, no more than about 1.8 mm, no more than about 1.7 mm, no more than about 1.6 mm, no more than about 1.5 mm, no more than about 1.4 mm, no more than about 1.3 mm, no more than about 1.2 mm, no more than about 1.1 mm, no more than about 1.0 mm, no more than about 0.9 mm, no more than about 0.8 mm, no more than about 0.8 mm, no more than about 0.7 mm, no more than about 0.6 mm, no more than about 0.5 mm, no more than about 0.4 mm, no more than about 0.3 mm, no more than about 0.2 mm, or no more than about 0.1 mm in the longest dimension.

The wet gel can include sticky or cohesive particles that measure up to about 20 mm in the longest dimension. In some embodiments, the sticky particles in the polymers measure up to about 1 mm, up to about 2 mm, up to about 3 mm, up to about 4 mm, up to about 5 mm, up to about 6 mm, up to about 7 mm, up to about 8 mm, up to about 9 mm, up to about 10 mm, up to about 11 mm, up to about 12 mm, up to about 13 mm, up to about 14 mm, up to about 15 mm, up to about 16 mm, up to about 17 mm, up to about 18 mm, up to about 19 mm, or up to about 20 mm in the longest dimension. This includes polymer particle sizes of about 6 mm to about 7 mm or about 7 mm to about 8 m in the longest dimension.

An increased molecular mass can increase the efficiency of the flocculation process. Thus, in some embodiments, the polymers have a high average molecular weight. In some embodiments, the polymers may have an average molecular weight of at least about 1 million, at least about 2 million, at least about 3 million, at least about 3 million, at least about 4 million, at least about 5 million, at least about 6 million, at least about 7 million, at least about 8 million, at least about 9 million, at least about 10 million, at least about 11 million, at least about 12 million, at least about 13 million, at least about 14 million, at least about 15 million, or at least about 16 million. This includes average molecular weights of about 6 million to about 18 million, about 10 million to about 17 million, and about 14 million to about 16 million for the polymers.

In the illustrated embodiment, the polymers are supplied into the mix tank 20 through a feeder or hopper 50. The feeder 50 may include a funnel. In other embodiments, however, the polymers may be supplied into the mix tank 20 through other mechanisms. Additionally, the mix tank 20 receives an inlet stream 60, and forms a polymer solution including swollen polymers (not shown). In the illustrated embodiment, the system 10 includes an agitator or screw 70 in the mix tank 20. The agitator 70 includes blades 74 and is configured to suitably mix, stir, or disperse the polymers in the mix tank 20. In case the polymers include long-chain molecules, an excessive agitation may undesirably rupture molecular bonds of the polymers. Thus, in some embodiments, the agitator 70 is configured to mix the polymers at a suitable rate substantially without rupturing the molecular bonds of the polymers. In some embodiments, an eductor (not shown) may be used between the agitator 70 and the mix tank 20 to improve particle dispersion.

The polymer solution is discharged from the mix tank 20, e.g., from the bottom or bottom side of the tank 20. As used herein, the terms "top," "bottom," "front," "rear," "side," and other directional terms are not intended to require any particular orientation, but are instead used for purposes of description only. The polymer solution discharged from the mix tank 20 is received in the strainer 30. The strainer 30 withdraws, extrudes, or strips at least a portion of the swollen polymers therethrough substantially without shear degradation, thereby forming a resultant solution.

The pump 40 is configured to receive the resultant solution, and to return the resultant solution to the inlet stream 60. In some embodiments, the pump 40 recirculates the polymer-lean solution to the top of the tank 20. As such, a flow loop is generated from the bottom of the tank 20 to the top of the tank 20. In the illustrated embodiment, the pump 40 includes a diaphragm (not shown). The diaphragm of the pump 40 can pulsate to create a vacuum through the flow loop. In the polymer solution upstream to the pump 40, the swollen polymers are expanded due to the vacuum created in the flow loop. On the other hand, in the resultant solution downstream to the pump 40, the swollen polymers are fragmentized or compressed, without rupturing, before the resultant solution is returned to the inlet stream 60. In some embodiments, the pulsation from the pump 40 can accelerate the dissolution of the polymers, without the shear degradation caused by prior art pump designs. In some embodiments, the pump 40 can move high-viscosity fluids, thereby allowing the use of concentrated solutions in the polymer dissolution system 10.

In some embodiments, the pump 40 may be an air-operated double-diaphragm pump, for example, the N25 Full Flow High Pressure Pump manufactured by Blagdon Pump in Export, Pa. or the Wilden® PX1500 pump manufactured by Air Pumping Ltd. in London, United Kingdom. The pump 40 has two liquid chambers, two air chambers, and first and second diaphragms 44, 48, which are connected by a common rod or shaft (not shown). In operation, an inner side of one diaphragm chamber is pressurized by compressed air while another inner chamber is exhausted. In particular, the compressed air is directed to a back of the diaphragm 44, thus moving the diaphragm 44 away from a center section. This causes a discharge stroke, moving the remaining polymer solution out of the pump 40. Simultaneously, the diaphragm 48 performs a suction stroke, pushing the air behind the diaphragm 48 out to the atmosphere and allowing the remaining polymer solution to flow into the inner chamber. In short, the compressed air in the pump 40 moves the diaphragms 44, 48 in a reciprocating action. As the diaphragm 48 completes the suction stroke, compressed air is directed to diaphragm 44 again, pushing it away from its center section, and thereby restarting a cycle. The pump 40 may further include ball valves that open and close alternatively to achieve the discharge and suction strokes.

Figure 2:
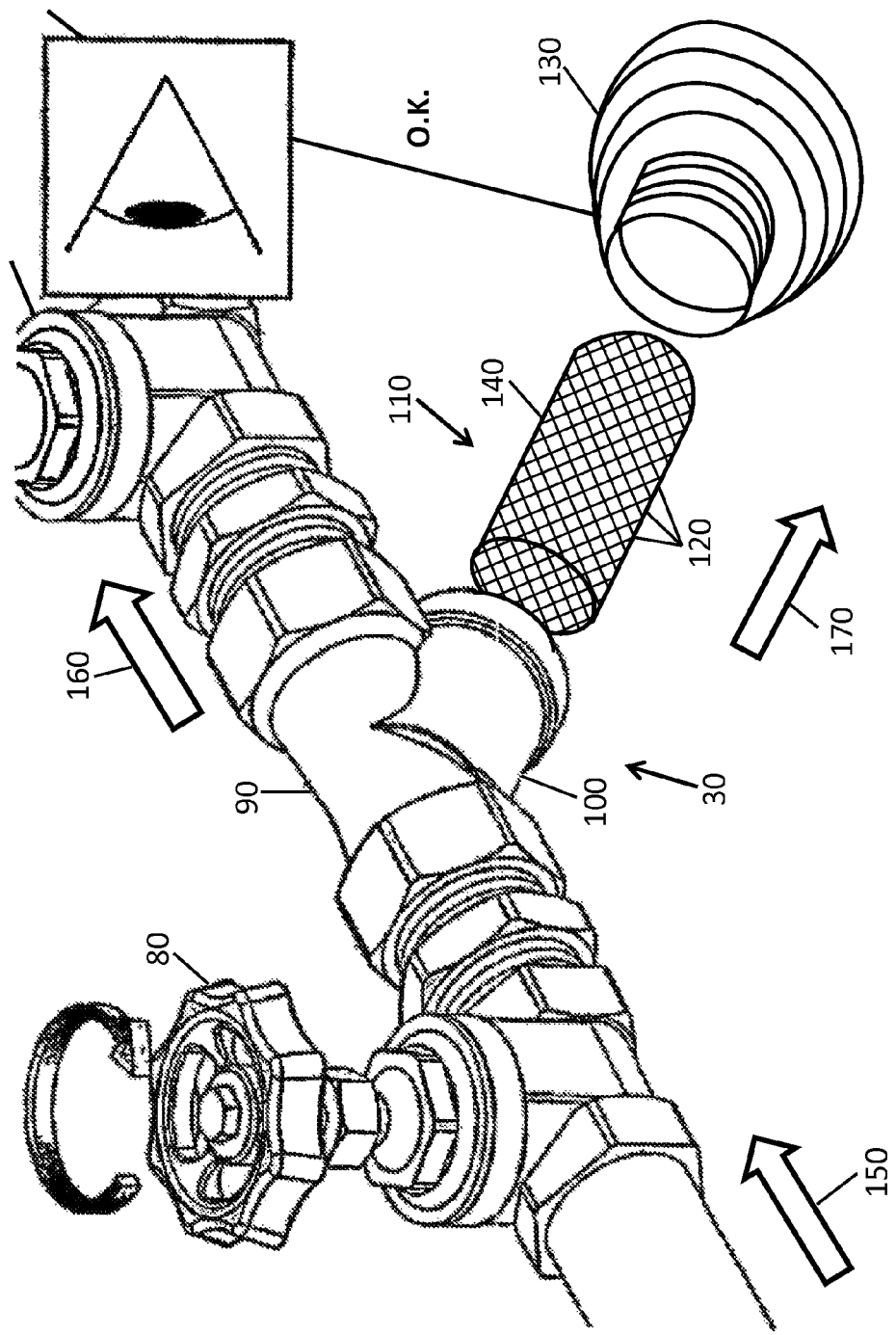
FIG. 2. Partial enlarged perspective view of the strainer of FIG. 1.

The polymer dissolution system 10 optionally includes a check valve 80 (see FIG. 2). The check valve 80 can facilitate moving at least one of the polymer solution and the resultant solution in one direction only and/or toward a predetermined direction.

3. STRAINER

As described above, the polymer dissolution system 10 includes the strainer 30 to withdraw or strip at least a portion of the swollen polymers from the polymer solution substantially without shear degradation. Referring also to FIG. 2, the strainer 30 comprises a first conduit 90, a second conduit 100 branching from the first conduit 90, and a filter, mesh, or screen 110 in the second conduit 100. The first and second conduits 90, 100 define an acute angle θ. As such, in some embodiments the strainer 30 generally gives the appearance of a y shape. In the illustrated embodiment, the first conduit 90 defines an inlet 94 and an outlet 98, and the screen 110 is positioned therebetween. The illustrated screen 110 is substantially cylindrical. In other embodiments, however, the screen 110 may assume any geometric form, including but not limited to, a conical, a pyramidal, an ellipsoidal, a regular polyhedral, and an irregular polyhedral shape, derivatives thereof, and combinations thereof.

In some embodiments, the screen 110 may be made of stainless steel or other corrosion-resistant materials. Stainless steels may be commonly grouped according to their chemical compositions into the following allow designations: a 302-type stainless steel, a 303-type stainless steel, a 304-type stainless steel, a 309-type stainless steel, a 310-type stainless steel, a 314-type stainless steel, a 316-type stainless steel, a 321-type stainless steel, a 347-type stainless steel, a 430-type stainless steel, 446-type stainless steel, and other precipitation-hardened stainless steels. Depending on the usage requirements or preferences for the particular polymer dissolution system 10, carbon steel may not provide suitable protection against corrosion. Nonetheless, the apparatus, methods, and articles of manufacture described herein are not limited in this regard.

The screen 110 includes openings 120 dimensioned so as to allow high-molecular-weight polymers or gel particles to pass through substantially without shear degradation. In some embodiments, each opening 120 may measure no more than about 4.0 mm, no more than about 3.9 mm, no more than about 3.8 mm, no more than about 3.7 mm, no more than about 3.6 mm, no more than about 3.5 mm, no more than about 3.4 mm, no more than about 3.3 mm, no more than about 3.2 mm, no more than about 3.1 mm, no more than about 3.0 mm, no more than about 2.9 mm, no more than about 2.8 mm, no more than about 2.7 mm, no more than about 2.6 mm, no more than about 2.5 mm, no more than about 2.4 mm, no more than about 2.3 mm, no more than about 2.2 mm, no more than about 2.1 mm, no more than about 2.0 mm, no more than about 1.9 mm, no more than about 1.8 mm, no more than about 1.7 mm, or no more than about 1.6 mm. This includes opening 120 sizes of about 3.1 mm to about 3.2 mm and about 1.5 mm to about 1.6 mm.

The swollen polymers or particles are distorted as they pass through the screen 110, thereby substantially avoiding shear degradation. For example, the polymer particles or molecules may stretch, uncoil, unfold, or expand at least in part as they pass through the openings 120 of the screen 110. This is achieved by the vacuum generated by the pump 40, which is in fluid communication with the strainer 30. The vacuum from the pump 40 applies a suction force to withdraw the swollen polymers through the screen 110, thereby distorting the polymers as they pass through the screen 110. The distortion of the polymers may also accelerate the polymer dissolution process. In general, a smaller sized opening 120 may stretch the polymer particles more compared to a larger sized opening 120. However, an opening 120 that is sized too small may require a stronger suction force from the pump 40, and/or become plugged up from time to time. On the other hand, an opening 120 that is sized too large may not provide a rapid dissolution of polymers.

In some embodiments, the strainer and pump cooperate together to maintain a viscosity of the remaining polymer solution substantially within a predetermined range. For example, a "gel number" test may be used to measure progress of the dissolution process. The gel number roughly represents the percent coverage left on a 7.6 cm diameter, 100 mesh screen after 200 grams of a 0.25% polymer solution is poured through it. A lower gel number can indicate that the dissolution is more complete. For example, a target gel number for a solution of a copolymer of acrylamide and 2-(acryloyloxy)-N,N,N-trimethylethanaminium chloride in a 9:1 molar ratio can be 0 G to about 1 G. On the other hand, a target gel number for a solution of a solution of a copolymer of acrylamide and 2-(acryloyloxy)-N,N,N-trimethylethanaminium chloride in a 1:1 molar ratio can be 0 G.

Furthermore, a reduced specific viscosity (RSV) may be used as a measure of polymer quality. This number indicates whether the process of dissolving the polymer has degraded the molecular weight of the polymer. The target RSV may be different for each polymer. For example, for a solution of a copolymer of acrylamide and 2-(acryloyloxy)-N,N,N-trimethylethanaminium chloride in a 9:1 molar ratio, the target RSV may be 18 dL/g or higher. On the other hand, for a solution of a copolymer of acrylamide and 2-(acryloyloxy)-N,N,N-trimethylethanaminium chloride in a 1:1 molar ratio, the target RSV may be 15 dL/g or higher. Lower RSVs can indicate degradation of molecular weight, which may be detrimental to the performance of the polymer solution.

In some embodiments, the screen 110 is removably coupled to the second conduit 100. In other embodiments, however, the screen 110 may be permanently attached to the second conduit 100. In the illustrated embodiment, the strainer 30 includes a screen-retaining cap or filter-retaining cap 130 in the second conduit 90.

4. METHOD OF USING THE STRAINER

In operation, the strainer 30 is positioned downstream from the mix tank 20 to receive the polymer solution and withdraw or strip swollen polymers from the polymer solution substantially without shear degradation. The polymer solution passes through the first conduit 90 of the strainer 30. The screen 110 in the second conduit 100 allows high-molecular-weight polymers or gel particles to pass through substantially without shear degradation. Therefore, an activated solution with dissolved polymers is discharged. A polymer-lean solution returns to the mix tank 20 via the first conduit 90 so that more polymers can be dissolved to continuously form an activated solution.

5. METHOD OF DISSOLVING HIGH-MOLECULAR-WEIGHT POLYMERS

The present disclosure is also directed to a method of dissolving high-molecular-weight polymers. The method comprises supplying high-molecular-weight polymers, water, and the inlet stream 60. A polymer solution including swollen polymers is formed. At least a portion of the swollen polymers is withdrawn or stripped through a strainer substantially without shear degradation, thereby forming a resultant solution. The resultant solution is returned to the inlet stream 60, and may be electrochemically activated.

In operation, the polymer solution forms in the mix tank 20, and flows from the mix tank 20 toward the strainer 30 in the direction 150. At the strainer 30, the polymer solution passes through the first conduit 90 in the direction 160. A resultant solution flows from the first conduit 90 to the pump 40, and then flows toward the mix tank 20 in the direction 180, thereby completing a cycle.

In some embodiments, the polymers are used as flocculants. For example, wastewater or aqueous slurries can be contacted with the resultant solution of the polymer dissolution system 10. The wastewater may come from various sources, including pulp and paper mills, and civil engineering and construction works such as mining, and dredging rivers, harbors, and fish farms. To treat the wastewater, the polymers in the resultant solution of the polymer dissolution system 10 are used as polyelectrolytic flocculants. The flocculants contact solids in the wastewater to form agglomerates, which precipitate out from the wastewater. Thus, the solids are removed from the wastewater.

6. EXAMPLES

Example 1

Polymer dissolution systems were made using various polymer forms for 10 mole % cationic polymers and pumps, with or without a y-strainer. The target gel number for this polymer was 0 G-1 G, and the target RSV was 18 dL/g or greater. For each system, parameters such as polymer solution flow rate, time to reach the target gel number, and RSV were measured. The following Table 1 summarizes the measurements.

Ref. Nos. 5, 7, 9, and 10 are control examples for wet gels in a 189 liter or 379 liter batch size, with no recycle pump or y-strainer. Compared to these control examples, Ref. Nos. 1 and 2 indicated that a homogenizer pump using high pressure/high shear, namely, the Tekmar pump, can reduce the time to reach the target gel number. However, the RSV resulting from use of the Tekmar pump in each case was lower compared to the control examples, indicating that the polymer molecular weight had undesirably degraded. Likewise, Ref. Nos. 3 and 4 indicated that a centrifugal pump, namely, the Deming pump, can reduce the time to reach the target gel number compared to the control example; however, the RSV was lower in each case, indicating that the polymer molecular weight had undesirably degraded. In contrast, Ref. Nos. 16 and 20 indicated that an air double diaphragm pump, namely, the Welden pump, coupled with a y-strainer, reduced the time to reach the target gel number compared to the control example, without the polymer degradation shown in Ref. Nos. 1-4.

Figure 3:
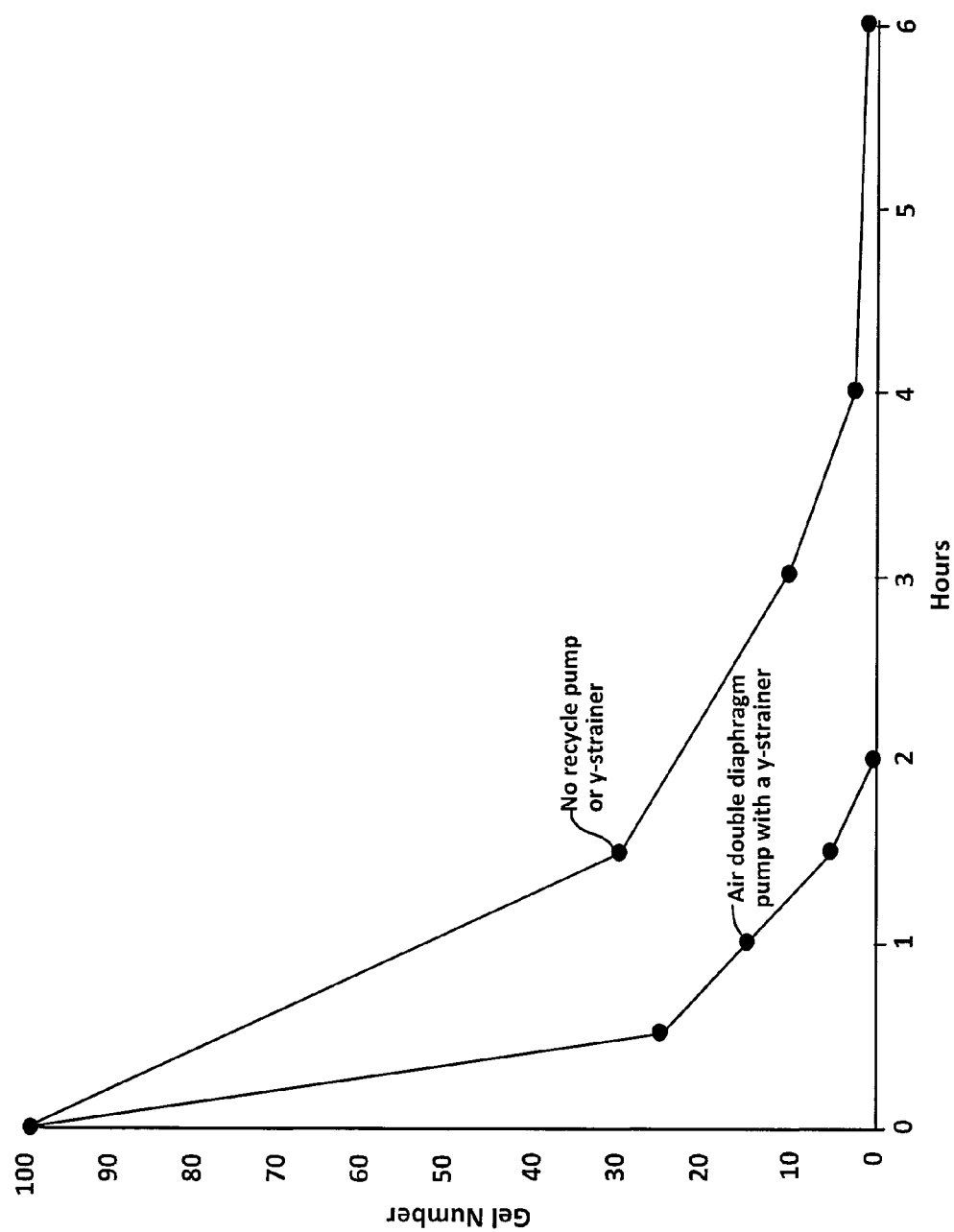
FIG. 3. Graph plotting dissolution times of a 10 mole % cationic wet polymer in a 2,839 liter batch size.

Ref. Nos. 6, 8, and 14 are control examples for wet gels in a 2,839 liter batch size with no recycle pump or y-strainer. Compared to these control examples, Ref. Nos. 12, 13, and 15 indicated that the Welden pump with a y-strainer can reduce the time to reach the target gel number without polymer degradation. Likewise, Ref. Nos. 18, 19, and 21 indicated that the 7.6 cm Welden pump (having a high flow rate), together with a y-strainer, can reduce the time to reach the target gel number without polymer degradation. FIG. 3 compares the dissolution times of Ref. Nos. 8 (no recycle pump or y-strainer) and 19 (air double diaphragm pump with a y-strainer).

TABLE 1

| Ref. No. | Batch size (liter) | Polymer form | Pump | Screen opening size | Flow rate (lpm) | 0 G-1 G time (hours) | RSV (dL/g) |
|---|---|---|---|---|---|---|---|
| 1 | 379 | 7.9 mm wet | Tekmar | N/A | 45 | 1 | 10 |
| 2 | 379 | 7.9 mm wet | Tekmar | N/A | 45 | 2.5 | 13 |
| 3 | 379 | 6.4 mm wet | Deming | N/A | 265 | 2 | 16 |
| 4 | 379 | 9.5 mm wet | Deming | N/A | 265 | 2.5 | 14 |
| 5 | 189 | 7.9 mm wet | none | N/A | 0 | 4 | 20 |
| 6 | 2,839 | 7.9 mm wet | none | N/A | 0 | 6 | 18 |
| 7 | 379 | 7.9 mm wet | none | N/A | 0 | 6 | 18 |
| 8 | 2,839 | 6.4 mm wet | none | N/A | 0 | 6 | 20 |
| 9 | 379 | 6.4 mm wet | none | N/A | 0 | 6 | 19 |
| 10 | 379 | 7.9 mm wet | none | N/A | 0 | 6 | 18 |
| 11 | 379 | dry | none | N/A | 0 | 6 | 17 |
| 12 | 2,839 | 7.9 mm wet | Welden | 3.2 mm | 265 | 3 | 18 |
| 13 | 2,839 | 7.9 mm wet | Welden | 3.2 mm | 265 | 2.5 | 19 |
| 14 | 2,839 | 7.9 mm wet | none | N/A | 0 | 4 | 20 |
| 15 | 2,839 | 6.4 mm wet | Welden | 3.2 mm | 265 | 2.5 | 21 |
| 16 | 379 | 6.4 mm wet | Welden | 3.2 mm |  | 2.5 | 20 |
| 17 | 757 | dry | Chem Flow Feeder | | | 3 | 14 |
| 18 | 2,839 | 7.9 mm wet | 7.6 cm Welden | 1.6 mm | 1,363 | 2 | 20 |
| 19 | 2,839 | 7.9 mm wet | 7.6 cm Welden | 1.6 mm | 1,363 | 2 | 19 |
| 20 | 379 | 7.9 mm wet | Welden | 1.6 mm | 121 | 2 | 18 |
| 21 | 2,839 | 7.9 mm wet | 7.6 cm Welden | 3.2 mm | 1,363 | 2 | 19 |
| 22 | 2,839 | dry | 7.6 cm Welden | 3.2 mm | 1,363 | 2 | 20 |
| 23 | 757 | dry | Chem Flow Feeder | | | 3 | 14 |
| 24 | 379 | dry | Welden | 3.2 mm | 121 | 3 | 19 |
| 25 | 2,839 | dry | 7.6 cm Welden | 3.2 mm | 1,363 | 2 | 18 |

Ref. No. 11 is a control example for dry particles (measuring no more than about 1.6 min in the longest dimension) in a 379 liter batch size, with no recycle pump or y-strainer. Compared to this control example, Ref. Nos. 17 and 23 indicated that a gear pump, namely, the Chem Flow Feeder, can reduce the time to reach the target gel number; however, the RSV in each case was lower compared to the control example, indicating that the polymer molecular weight had undesirably degraded. In contrast, Ref. No. 24 indicated that the Welden pump with a y-strainer can reduce the time to reach the target gel number, without the polymer degradation shown in Ref. Nos. 17 and 23. Likewise, Ref. Nos. 22 and 25 indicated that for dry particles (measuring no more than about 1.6 mm in the longest dimension) in a 2,839 liter batch size, the Welden pump with a y-strainer can reduce the time to reach the target gel number, without polymer degradation.

In sum, the examples using a Welden pump coupled with a y-strainer indicated that the dissolution time can be reduced from about 4-6 hours to about 2 hours. The high flow-rates achieved through a 7.6 cm Welden pump (an air double diaphragm pump) did not appear to degrade the polymer molecular weight. In addition, screen openings as small as 1.6 mm did not appear to degrade the polymer molecular weight.

Example 2

Polymer dissolution systems were made using various polymer forms for 50 mole % cationic polymers and pumps, with or without a y-strainer. The target gel number for this polymer was 0 G, and the target RSV was 15 dL/g or greater.

For each system, parameters such as polymer solution flow rate, time to reach a target gel number, and RSV were measured. The following Table 2 summarizes the measurements.

Figure 4:
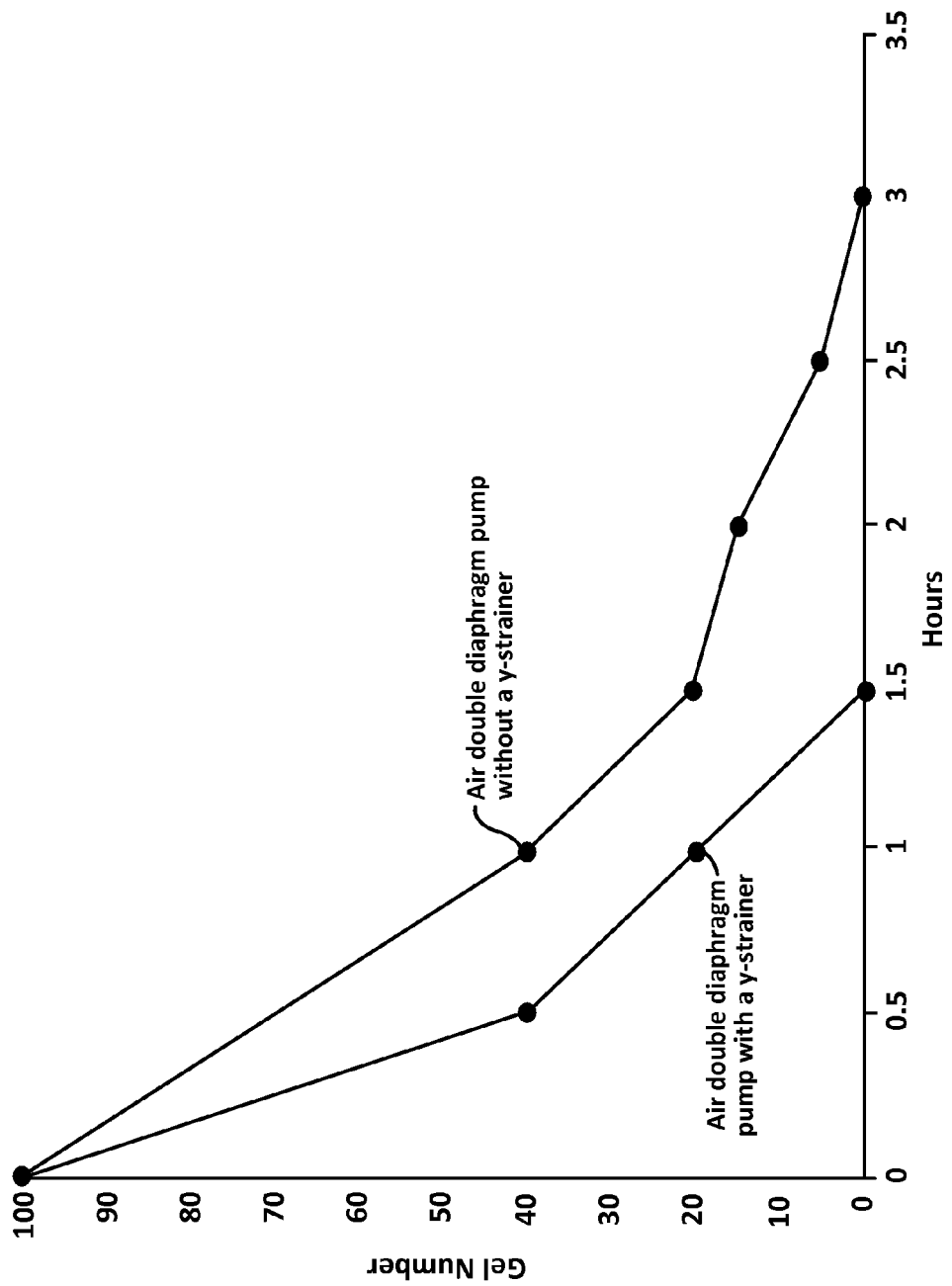
FIG. 4. Graph plotting dissolution times of a 50 mole % cationic wet polymer in a 379 liter batch size.

Refs. A and B are control examples for wet gels in a 189 liter or 379 liter batch size, with no recycle pump or y-strainer. Compared to these control examples, Refs. H, K, and L indicated the Welden pump, coupled with a y-strainer, reduced the time to reach the target gel number, without polymer degradation. Refs. I and M indicated that a screen would be required for fast dissolution of polymers. FIG. 4 compares the dissolution times of Refs. H (air double diaphragm pump with a y-strainer) and M (air double diaphragm pump without a y-strainer).

Refs. E, F, and O are control examples for wet gels in a 2,839 liter batch size with no recycle pump or y-strainer. Compared to these control examples, Refs. N and P indicated that the Welden pump with a y-strainer can reduce the time to reach the target gel number without polymer degradation. Ref. Q indicated that small screen openings (e.g., 1.6 mm or less) can get undesirably plugged with gel particles.

Refs. C and D are control example for dry particles (measuring no more than about 1.6 mm in the longest dimension) in a 189 liter-757 liter batch size, with no recycle pump or y-strainer. Compared to this control example, Ref. S indicated that the Chem Flow Feeder can reduce the time to reach the target gel number; however, the RSV was lower compared to the control example, indicating that the polymer molecular weight had undesirably degraded. In contrast, Ref. R indicated that the Welden pump with a y-strainer can reduce the time to reach the target gel number, with less polymer degradation.

TABLE 2

| Ref. | Batch size (liter) | Agitator RPM | Polymer form | Pump | Screen opening size | Flow rate (lpm) | 0 G time (hours) | RSV (dL/g) |
|---|---|---|---|---|---|---|---|---|
| A | 189 | 250 | 7.9 mm wet | none | N/A | 0 | 4 | 15.5 |
| B | 379 | 110 | 7.9 mm wet | none | N/A | 0 | 4 | 15.5 |
| C | 189 | 250 | dry | none | N/A | 0 | 4 | 15.7 |
| D | 379 | 160 | dry | none | N/A | 0 | 6 | 14.8 |
| E | 2,839 | 75 | 7.9 mm wet | none | N/A | 0 | 5 | 14.6 |
| F | 2,839 | 75 | 6.4 mm wet | none | N/A | 0 | 4 | 15.2 |
| H | 379 | 130 | 7.9 mm wet | Welden | 3.2 mm | 121 | 1.5 | 14.6 |
| I | 379 | 130 | 7.9 mm wet | Welden | N/A | 121 | >2.5 | |
| J | 379 | 130 | 7.9 mm wet | Viking | 3.2 mm | 23 | 1.5 | 13.5 |
| K | 379 | 130 | 7.9 mm wet | Welden | 3.2 mm | 121 | 1.5 | 16.3 |
| L | 379 | 130 | 7.9 mm wet | Welden | 3.2 mm | 121 | 1.5 | 14.9 |
| M | 379 | 130 | 7.9 mm wet | Welden | N/A | 121 | 3 | 14.4 |
| N | 2,839 | 75 | 6.4 mm wet | Welden | 3.2 mm | 454 | 1.5 | 15.1 |
| O | 2,839 | 75 | 7.9 mm wet | None | N/A | 0 | 3 | 15.1 |
| P | 2,839 | 75 | 7.9 mm wet | Welden | 3.2 mm | 454 | 2 | 14.9 |
| Q | 2,839 | 75 | 7.9 mm wet | Welden | 1.6 mm | screen plugged | | |
| R | 379 | 130 | dry | Welden | 3.2 mm | 121 | 2.5 | 13.6 |
| S | 757 | | Dry | Chem Flow Feeder | | | 3 | 10.7 |

In sum, the examples using a Welden pump coupled with a y-strainer indicated that the dissolution time can be reduced from about 3-5 hours to about 1.5-2 hours. In case of dry particles, the dissolution times can be reduced from about 4-6 hours to about 2.5 hours.

Although the invention has been described in detail with reference to certain preferred embodiments, variations and modifications exist within the scope and spirit of one or more independent aspects of the invention as described.

What is claimed is:

1. A polymer dissolution system comprising:
   a loop comprising a mix tank, a strainer and a circulating pump;
   said mix tank comprising an inlet and an outlet;
   said strainer comprising an inlet and an outlet, said strainer further comprising a screen that includes openings dimensioned to allow swollen polymer particles or gel particles thereof to pass through without shear degradation; and
   said circulating pump comprising an inlet and an outlet;

wherein:
said mix tank outlet is in fluid communication with said strainer inlet, said strainer outlet is in fluid communication with said circulating pump inlet, and said circulating pump outlet is in fluid communication with said mix tank inlet;
said mix tank is configured to:
receive and mix water, an inlet stream, and a polymer having an average molecular weight of at least about 1 million; and
discharge a polymer solution containing swollen polymer particles or gel particles thereof, said polymer solution formed by the mixing of the water, inlet stream and polymer;
said strainer is configured to:
receive the polymer solution from the mix tank,
allow said polymer solution to pass through the screen without shear degradation of said swollen polymer particles or gel particles thereof to obtain a strained polymer solution; and
discharge the strained polymer solution to said circulating pump,
wherein at least a portion of said swollen polymer particles or gel particles thereof in said strained polymer solution have passed through the screen and
wherein said swollen polymer particles or gel particles thereof are dissolved at least in part in the strained polymer solution;
said circulating pump is configured to receive and return the strained polymer solution as the inlet stream to the mix tank; and
said circulating pump includes a diaphragm, said diaphragm configured to expand said swollen polymers or gel particles thereof in said strained polymer solution and to fragmentize said swollen polymers or gel particles thereof in the strained polymer solution before being returned to the inlet stream.

2. The system of claim 1, further comprising a hopper, the hopper supplying the polymer into the mix tank.

3. The system of claim 1, further comprising an agitator in the mix tank, the agitator configured to disperse the polymer in the mix tank.

4. The system of claim 1, wherein the strainer includes a first conduit and a second conduit branching from the first conduit, wherein the screen is insertable into the second conduit.

5. The system of claim 4, wherein the first and second conduits define an acute angle.

6. The system of claim 4, wherein the screen is removably coupled to the second conduit.

7. The system of claim 4, further comprising a screen-retaining cap in the second conduit.

8. The system of claim 1, wherein the strainer and the circulating pump maintain a viscosity of the strained polymer solution within a predetermined range.

9. The system of claim 1, wherein the polymer includes at least one of a dry polymer powder and a wet gel.

10. The system of claim 1, wherein the polymer includes a polymer having an average molecular weight of at least about 2 million.

11. The system of claim 1, further comprising a check valve that facilitates moving at least one of the polymer solution and the strained polymer solution toward a predetermined direction.

* * * * *